United States Patent
Collins

(10) Patent No.: US 10,309,225 B2
(45) Date of Patent: Jun. 4, 2019

(54) ACTUATOR FOR USE IN A ROTOR BLADE

(75) Inventor: Andrew John Collins, Weston Super Mare (GB)

(73) Assignee: MICROTECNICA S.R.L., Turin (IT)

( * ) Notice: Subject to any disclaimer, the term of this patent is extended or adjusted under 35 U.S.C. 154(b) by 1197 days.

(21) Appl. No.: 13/700,282

(22) PCT Filed: May 27, 2011

(86) PCT No.: PCT/GB2011/050999
§ 371 (c)(1),
(2), (4) Date: Jun. 10, 2013

(87) PCT Pub. No.: WO2011/148186
PCT Pub. Date: Dec. 1, 2011

(65) Prior Publication Data
US 2013/0272873 A1 Oct. 17, 2013

(30) Foreign Application Priority Data
May 28, 2010 (GB) .................................. 1009086.8

(51) Int. Cl.
*F01D 5/12* (2006.01)
*B64C 27/615* (2006.01)
*B64C 27/72* (2006.01)

(52) U.S. Cl.
CPC .............. *F01D 5/12* (2013.01); *B64C 27/615* (2013.01); *B64C 2027/7272* (2013.01); *Y02T 50/34* (2013.01)

(58) Field of Classification Search
CPC ... F01D 5/12; F01D 7/00; B64C 27/38; B64C 27/72; B64C 27/615; B64C 2027/7266; B64C 2027/7272; B64C 2027/7294; F04D 29/06; F04D 29/063; F04D 29/36; F04D 29/362; F16H 25/2015; F15B 15/28; F15B 15/2815
USPC ........................................................ 74/89.44
See application file for complete search history.

(56) References Cited

U.S. PATENT DOCUMENTS

| 4,284,254 A | | 8/1981 | Rieben | |
|---|---|---|---|---|
| 5,387,083 A | * | 2/1995 | Larson | .................. B64C 27/615 416/23 |
| 5,409,183 A | * | 4/1995 | Gunsallus | ............. B64C 27/615 244/17.13 |
| 2006/0207421 A1 | | 9/2006 | Muller | |
| 2007/0231137 A1 | | 10/2007 | Nitzpon | |

(Continued)

FOREIGN PATENT DOCUMENTS

WO    2008/147450    12/2008

OTHER PUBLICATIONS

International Search Report for International Application No. PCT/GB2011/050999 dated Oct. 31, 2011.

(Continued)

*Primary Examiner* — Ninh H. Nguyen
*Assistant Examiner* — Brian P Wolcott
(74) *Attorney, Agent, or Firm* — Cantor Colburn LLP

(57) ABSTRACT

A rotor blade includes an actuator comprising an electric motor having a rotary drive shaft, a bearing for mounting the rotary drive shaft along an axis extending along the length of the rotor blade, and a lubrication system for lubricating the bearing. The lubrication system includes a sump closer to the tip of the blade than the bearing, and a pump for pumping lubricant from the sump to the bearing.

10 Claims, 4 Drawing Sheets

(56) References Cited

U.S. PATENT DOCUMENTS

2009/0260463 A1\* 10/2009 Fukano ............... F16H 25/2454
74/89.33
2010/0275710 A1\* 11/2010 Wingett ................. F16H 25/20
74/424.82

OTHER PUBLICATIONS

European Search Report for EP Application No. 16170834.2 dated Sep. 19, 2016.

\* cited by examiner

ACTUATOR FOR USE IN A ROTOR BLADE

CROSS REFERENCE TO RELATED APPLICATION

The present application is the U.S. national stage application of International Application PCT/GB2011/050999, filed May 27, 2011, which international application was published on Dec. 1, 2011, as International Publication WO 2011/148186. The International Application claims priority of British Patent Application 1009086.8, filed May 28, 2010, the contents of which are incorporated herein by reference in their entireties.

TECHNICAL FIELD

This invention relates generally to actuators for use in rotor blades of rotorcraft, in particular but not exclusively helicopters, to a rotorcraft including such a rotor blade and to a method of actuating an element in a rotor blade.

BACKGROUND OF THE INVENTION

The design of components in rotor blades for rotorcraft, especially helicopters, is very challenging. The main rotor of a helicopter of standard design may be mounted for rotation about an approximately vertical axis passing close to the centre of mass of the helicopter. When the helicopter is not moving forwards through the air, the blades on the helicopter may experience approximately constant conditions as they rotate through an entire revolution about the vertical axis. As is well known, however, at other times, for example when the helicopter is moving forwards through the air, the conditions for a blade, especially its airspeed, may be very different when the blade is moving forwards on one side of the helicopter from when it is moving rearwardly on the other side of the helicopter. In order to take account of this problem a swashplate may be provided in the region of the connection of the rotor blades to the swashplate and, through a mechanical camming action, may alter a characteristic of each blade as it rotates; for example, the pitch of the blades may be varied.

In order to provide a control via a swashplate of the kind just described relatively large loads must be applied and this leads both to high energy consumption levels and to an increase in the mass of the helicopter. Similar situations arise with other forms of rotorcraft for example autogyros.

In an attempt to avoid such disadvantages and to provide more adjustability of the blade, it has been proposed to provide adjustable aerodynamic elements on a rotor blade in a manner somewhat similar to that in which elements might be provided on a fixed wing of an aircraft. There are, however, substantial additional complications if such an approach is adopted in respect of a rotor of a rotorcraft: a first principal difference is that the rotor rotates in use at considerable speed relative to the body of the rotorcraft making transmission of power from the body of the rotorcraft to the rotor more difficult; the second principal difference is that the rotor rotates at a high speed so that, especially towards the tip of the rotor blade, there may be high g forces. For example, it is not unusual for there to be g forces of 700 g in the region of a tip of a rotor blade.

It has been proposed to provide an actuator including an electric motor in a rotor blade in order to avoid transmission of mechanical power via the swash plate. The electric motor drives a rotary drive shaft and the rotation of that shaft then needs to be converted typically into a linear motion to drive an adjustable aerodynamic element on the rotor blade. It has been proposed to convert the rotary motion into linear motion by providing a travelling nut that is held against-rotation and screw threadedly engages a correspondingly threaded portion of the drive shaft.

A problem that arises in an actuator of the kind just described concerns lubrication of the actuator. This is a particular challenge because the high g forces that are typically present in a rotor blade act against natural circulation of lubricant to the parts that require lubrication. In an attempt to overcome this problem, WO2008/147450 proposes an arrangement in which an electric motor and drive shaft are immersed in a cavity full of lubricant. Since the cavity is full of lubricant there is no scope for lubricant to move to one end of the cavity so that all the parts within the cavity are exposed to lubricant. This approach has various disadvantages, however; a particular problem is that the lubricant inevitably creates resistance to relative movement of parts leading to considerable viscous losses. That is a particular issue in a conventional electric motor where the rotor is closely surrounded by the stator and the presence of lubricant can lead to high viscous losses, especially when the whole of the space between the armature and the stator is filled with lubricant.

It is an object of the invention to provide an improved actuator for use in a rotor blade of a rotorcraft and to provide an improved method of actuating an aerodynamic element on a rotor blade.

SUMMARY OF THE INVENTION

According to the invention there is provided a rotor blade including an actuator comprising an electric motor having a rotary drive shaft, a bearing for mounting the rotary drive shaft along an axis extending along the length of the rotor blade, and a lubrication system for lubricating the bearing, the lubrication system including a sump closer to the tip of the blade than the bearing, and a pump for pumping lubricant from the sump to the bearing.

By providing a sump of a lubrication system at the tip end of an actuator and pumping the lubricant from the sump to a bearing, a reliable lubrication system with low viscous losses can be provided.

A portion of the rotary drive shaft is preferably threaded and a correspondingly threaded output member mounted non-rotatably on the rotary drive shaft, whereby rotation of the drive shaft results in linear movement of the output member. In such an arrangement the output member is preferably arranged to drive the pump. When such an actuator is employed to create a reciprocating movement of the output member, typically synchronised to the speed of rotation of the rotor blade, then that movement provides a regular pumping action.

The pump is preferably a positive displacement pump. That is especially the case in the present invention because of the high g forces that arise in the present invention and that have to be overcome to pump lubricant from the sump. More particularly, the output drive member is preferably in fixed axial relationship to a cylinder of a piston and cylinder pump and the rotary drive shaft is in fixed axial relationship to the piston of the piston and cylinder pump. The cylinder may be fixed to the output drive member. The piston may be fixed to the rotary drive shaft. Thus the piston may move both axially and rotatably relative to the cylinder.

An especially preferred form of the invention is one in which the bearing is positioned between the electric motor and the output member. Preferably there is no further bearing on the other side of the electric motor. While it is common to mount the armature of an electric motor on two bearings, one on each side of the motor, that is not essential, especially if the bearing that is provided is away from either end of the motor shaft. The bearing in a described embodiment of the invention is a double race ball bearing but many other forms of bearing may be used.

The actuator preferably includes a housing having a first part in which the electric motor is received and a second part fixed to the output member, the first and second parts being mounted for sliding movement relative to one another in a direction parallel to the axis of the rotary drive shaft. The first and second parts are preferably mounted such that they are not rotatable relative to one another.

The first and second housing parts are preferably provided with respective projections which move relative to one another when the rotary drive shaft rotates, the relative movement of the projections providing the output of the actuator.

Preferably the actuator includes a sensor for detecting the position of the output member along the axis of the rotary drive shaft. Accurate control of the actuator is thereby facilitated.

Preferably the travel of lubricant in the lubrication system from the sump away from the tip of the blade does not reach the electric motor. Especially because the sump is towards the tip end of the actuator, the high g forces present during operation of the actuator facilitate preventing the lubricant from reaching the electric motor. A seal between the bearing and the motor may also be provided to prevent lubricant reaching the motor.

Whilst the invention has been described above with reference to a rotor blade, it will be noted that the inventive concept resides primarily in the actuator and it is desired to protect the actuator when made or sold separately. Accordingly the present invention further provides an actuator for use in a rotor blade as defined above.

The present invention further provides a rotorcraft including a rotor blade as defined above. The rotorcraft may be a helicopter, although it should be understood that the invention is also applicable to other rotorcraft, such as autogyros.

The present invention still further provides a method of actuating an aerodynamic element on a rotor blade, the method comprising the following steps:

providing an electric motor having a rotary drive shaft, a bearing for mounting the rotary drive shaft along an axis extending along the length of the rotor blade, and a lubrication system for lubricating the bearing, the lubrication system including a sump closer to the tip of the blade than the bearing, and a pump for pumping lubricant from the sump to the bearing; and operating the pump to pump lubricant from the sump to the bearing.

The rotor blade may be a rotor blade of any of the forms defined above. For example, preferably the lubricant does not reach the electric motor.

Preferably the pump completes a pumping cycle each time the rotor blade completes a revolution.

It will be appreciated that the rotor blade, actuator and method of the invention as described herein are closely related and that therefore essential or preferred features of one may, unless indicated otherwise or clearly inappropriate, be incorporated into the other. Thus, features described above in respect of the actuator or rotor blade of the invention may be incorporated into the method of the invention and vice versa.

BRIEF DESCRIPTION OF THE DRAWINGS

By way of example embodiments of the invention will now be described with reference to the accompanying schematic drawings, of which.

DETAILED DESCRIPTION OF EMBODIMENTS

Figure 1:
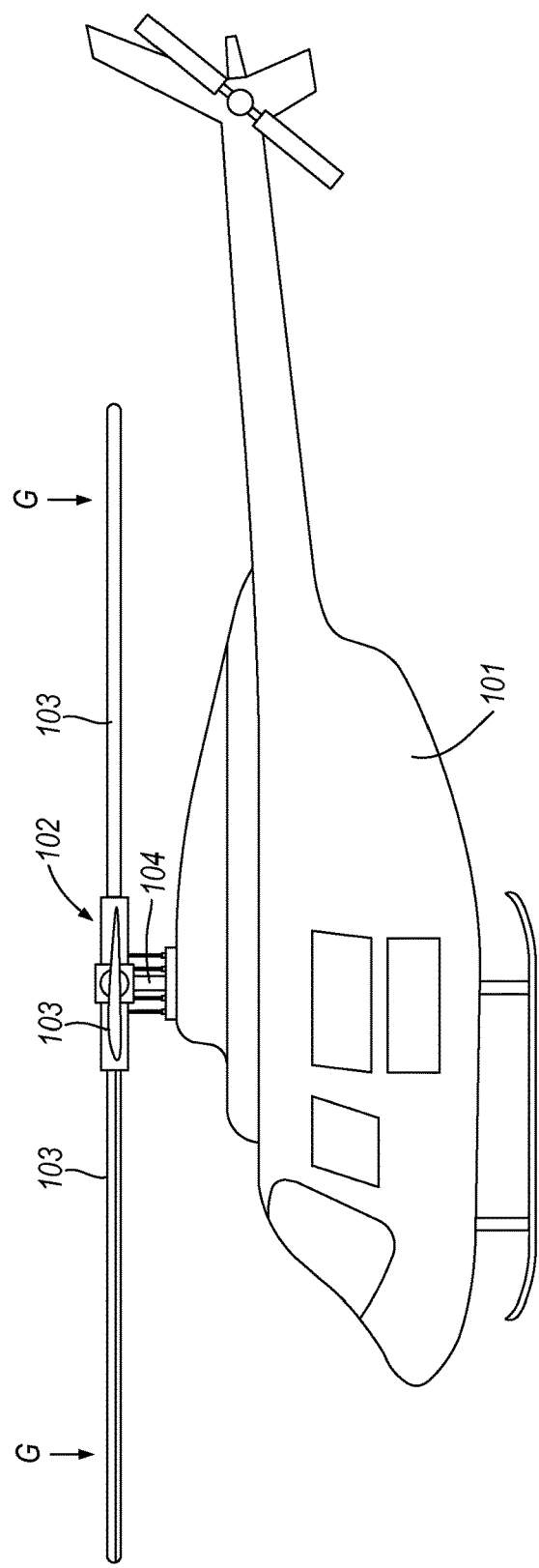
FIG. 1 is a side view of a helicopter including a main rotor having four rotor blades.

The helicopter 101 shown in FIG. 1 includes a main rotor 102 comprising four rotor blades 103 rotatable on a shaft 104. When the helicopter is at rest on the ground the shaft 104 is disposed along an approximately vertical axis. Apart from the rotor blades the design of the helicopter may be entirely conventional and the pitch of each of the blades may for example be controlled by a swashplate in the region of the top of the shaft 104, in a manner that is well known.

Each of the rotor blades 103 is also of generally conventional design but includes a special additional feature as will now be described. On the trailing edge of each rotor blade, in the region marked G in FIG. 1, which is about 80% of the distance along the rotor blade 103 from the shaft 104 towards the tip of the blade, an aerodynamic element, for example a Gurney flap, is provided on the underside of the trailing edge of the blade, as shown for example in our International Application No. PCT/GB2011/050669, the contents of which are incorporated herein by reference. The element is adjusted by the actuator assembly shown in FIG. 2.

Figure 2:
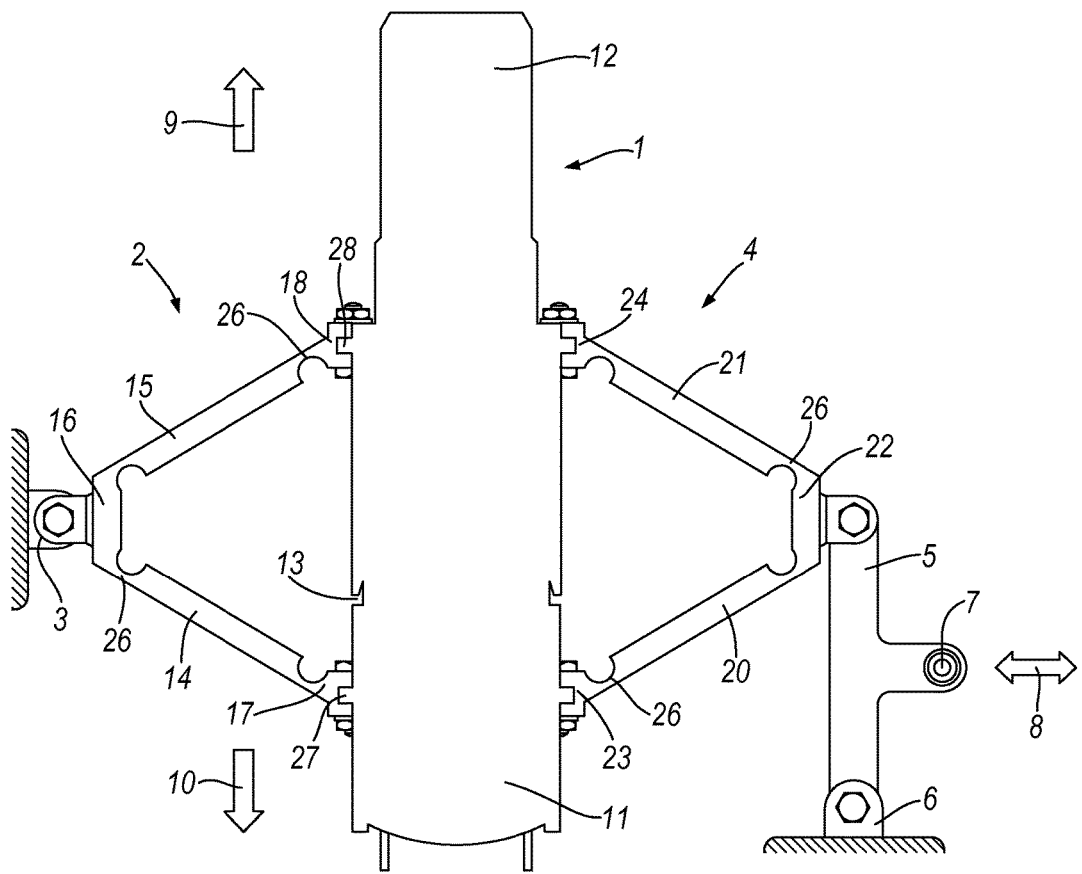
FIG. 2 is a plan view of an actuator assembly that is provided in each of the rotor blades.

Referring now to FIG. 2 there is shown an actuator assembly generally comprising an actuator 1, a first linkage 2 pivotally connected to a first mounting 3, a second linkage 4, and an output member 5 pivotally connected to a second mounting 6 at one end, and to the second linkage 4 at the other end. The output member carries an output connection 7 intermediate its ends and that output connection is drivingly connected to the aerodynamic element to be driven. The output connection 7 is driven to and fro towards and away from the first mounting 3 as indicated by the double headed arrow 8 in FIG. 2.

The actuator 1 is of an elongate shape and is disposed with its longitudinal axis aligned on a radial line extending from the axis of rotation of the shaft 104, and orientated such that the direction of the tip of the rotor blade is in the direction of the arrow 9 in FIG. 2, while the root of the rotor blade is in the direction of the arrow 10 in FIG. 2. As will be described in more detail below, the actuator includes two housings 11 and 12 that are slidable but not rotatable relative to one another, the housing 12 being closer to the blade tip than the housing 11. In FIG. 2 a small gap 13 marking the boundary between the housings is visible.

The first linkage 2 is formed as a one-piece member comprising a first part 14, a second part 15 and a short connecting link 16. One end of the first part 14 of the linkage 2 is, pivotally connected to the housing 11 of the actuator 1 at a first connection point 17, and one end of the second part 15 is pivotally connected to the housing 12 of the actuator 1 at a second connection point 18. The opposite ends of the parts 14 and 15 are pivotally connected to the opposite ends of the short connecting link 16. The link 16 is pivotally connected to the first mounting 3.

The second linkage 4 is formed as a one-piece member comprising a third part 20, a fourth part 21 and a short connecting link 22. One end of the third part 20 of the linkage 4 is pivotally connected to the housing 11 of the actuator 1 at a third connection point 23, and one end of the fourth part 21 is pivotally connected to the housing 12 of the actuator 1 at a fourth connection point 24. The opposite ends of the parts 20 and 21 are pivotally connected to the opposite ends of the short connecting link 22. The link 22 is pivotally connected to one end of the output member 5.

The pivotal connections between the different parts of each linkage and the pivotal connections to the actuator are all formed by reduced cross-section portions of the members defining the parts. The reduced cross-section portions define flexures 26 allowing the parts on opposite sides of each flexure to pivot relative to one another. It should be understood that one or more of the other pivotal connections, not shown as flexures could also be provided as flexures if preferred. The term "flexure" as used in this specification refers to a flexible element which is able to bend to accommodate a change of angle between one part of the element and another. Such flexures are advantageous in a high g environment because they avoid the difficulties that arise where one surface is required to move over another.

At the first and third connection points 17 and 23 the first and second linkages are connected to a flange 27 on the housing 11 and at the second and fourth connection points the first and second linkages are connected to a flange 28 on the housing 12.

The linkages may be made of a variety of materials including metals such as titanium or certain steels, and also including carbon fibre materials and plastics materials.

Figure 3:
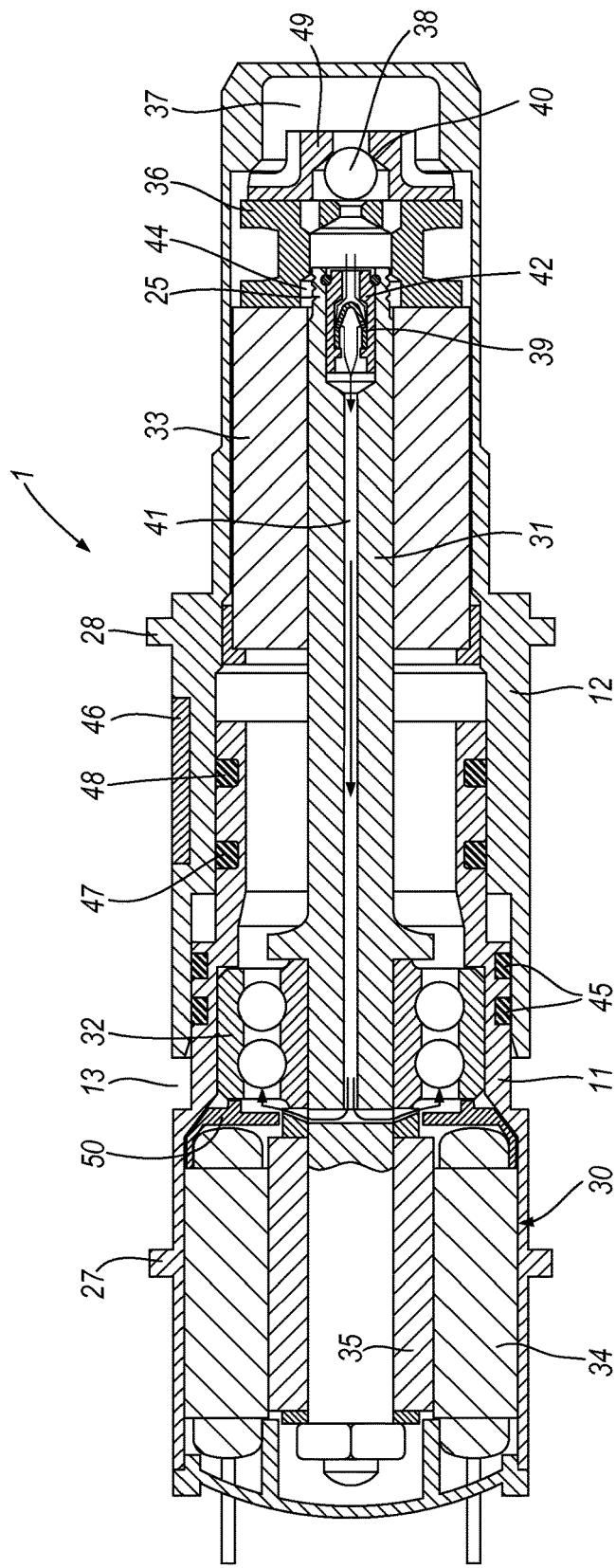
FIG. 3 is a sectional view of an actuator of the assembly shown in FIG. 2, with the actuator shown in an extended position and retracting from that position towards a retracted position.
Figure 4:
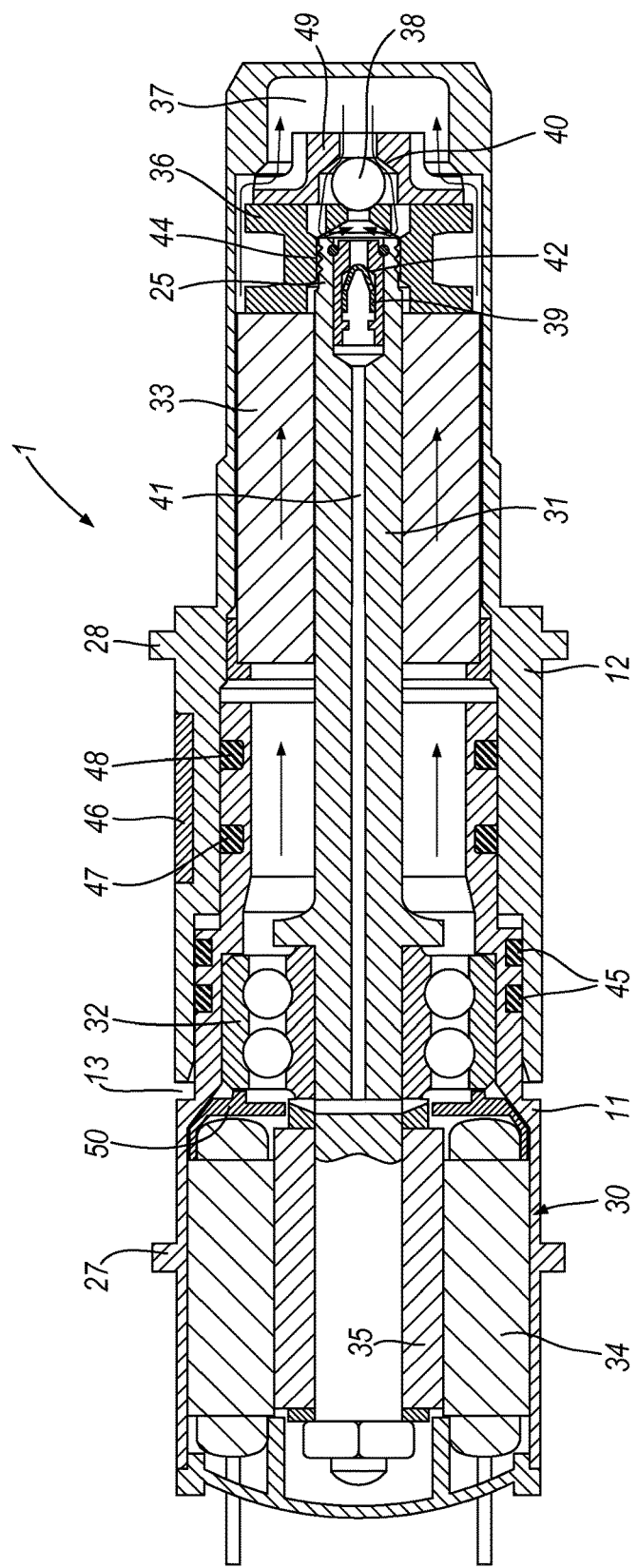
FIG. 4 is a sectional view of the actuator shown in FIG. 3, with the actuator shown in a retracted position and extending from that position towards an extended position.

The actuator 1 is shown in more detail in FIGS. 3 and 4. The actuator generally comprises a motor assembly 30, including a rotary drive shaft 31, a main bearing 32 in which the shaft 31 is rotatably mounted, and an output member in the form of a roller screw nut 33 that screw-threadedly engages an externally threaded portion of the drive shaft. The housing 11 mounts the motor assembly 30 and the main bearing 32, whilst the nut 33 is fixedly mounted in the housing 12. Thus, when the shaft 31 is rotated by the motor the nut 33 moves along the shaft 31 towards or away from the motor assembly 30 and the housings 11 and 12 slide relative to one another.

The motor assembly 30 comprises a stator 34 and an armature 35 carried on the shaft 31. In the example shown, the main bearing 32 is shown as a ball bearing with two ball races. The main bearing 32 is located between the motor assembly 30 and the nut 33 intermediate the ends of the shaft 31. As can be seen from FIGS. 3 and 4, no bearing is provided on the opposite side of the motor assembly to the main bearing 32.

The actuator 1 is provided with a pumped lubrication system for lubricating the main bearing 32 and the interengaging portions of the shaft 31 and the nut 33. The main components of the pump are a piston 25 defined by the end of the rotary drive shaft 31, a cylinder formed by a gland 36 fixed to the end of the nut 33, a sump 37, a first one-way valve defined by a ball 38 and a valve seat formed by a gland 49, and a second one-way valve defined by a valve member 39.

The ball 38 moves between a closed position shown in FIG. 3 in which it is seated in an outlet opening 40 of the gland 49 to prevent flow of lubricant through the opening into the sump 37 and an open position shown in FIG. 4 in which it is clear of the opening 40 and lubricant is free to flow out of the sump 37 and into the cylinder in the gland 36. The valve member 39 similarly moves between a closed position and an open position. The closed position is shown in FIG. 4: a passageway 41 along the central axis of the shaft 31 is closed at the piston 25 by virtue of the valve member 39 resting on a valve seat 42 in the piston, the closed valve member preventing flow of lubricant from the passageway 41 into the cylinder. The open position is shown in FIG. 3: the valve member 39 is spaced from the valve seat 42 and lubricant is free to flow from the cylinder into the passageway 41.

The piston 25 is provided around its periphery with a plurality of circumferential ribs 44 which are closely surrounded by the interior of the gland 36 to provide circumferential channels which fill with lubricant and provide pressure equalisation around the piston whilst accommodating the relative axial and rotational movements between the piston and the gland.

A pair of sealing members 45 prevent lubricant leaking from the actuator between the interface of the housings 11 and 12. The outer seal, which may be referred to as a "scraper" provides a barrier to the ingress of dirt whilst the inner seal prevents the lubricant escaping. A position sensor system comprising elements 46, 47 and 48 is provided to provide feedback to a control system of the position of the housing 12 relative to the housing 11, so that the operation of the actuator can be accurately controlled. In this particular example, the position sensor system is a magnetoresistive sensor comprising magnets 47 and 48 and a sensor 46 incorporating a printed circuit board. Other position sensing systems may alternatively be used.

Operation of the actuator assembly will now be described. Referring first to FIG. 2, when the actuator is extended to move the flanges 27 and 28 apart, the first and second linkages flex about the flexures 26 and the short connecting links 16 and 22 move inwardly towards the actuator 1, with the spacing between the short connecting links 16 and 22 reducing. Since the first linkage 2 is connected to the body of the rotor blade at the first mounting 3, the effect of the movement of the linkages is to draw the short connecting link 22 towards the mounting 3, that is to the left as viewed in FIG. 2. The movement causes the output member 5 to pivot anticlockwise as viewed in FIG. 2 about the mounting 6, which in turn causes the output connection 7 to move to the left as viewed in FIG. 2. Conversely, when the actuator is retracted to move the flanges 27 and 28 together, the first and second linkages flex about the flexures 26 and the short connecting links 16 and 22 move outwardly away from the actuator 1, with the spacing between the short connecting links 16 and 22 increasing. Since the first linkage 2 is connected to the body of the rotor blade at the first mounting 3, the effect of the movement of the linkages is to move the short connecting link 22 away from the mounting 3, that is to the right as viewed in FIG. 2. The movement causes the output member 5 to pivot clockwise as viewed in FIG. 2 about the mounting 6, which in turn causes the output connection 7 to move to the right as viewed in FIG. 2.

Thus, by extending and retracting the actuator, the output connection 7 can be moved to the left and to the right respectively, as viewed in FIG. 2. An aerodynamic element can therefore be easily adjusted by those movements; for example, a Gurney flap connected to the output connection 7 may be retracted when the connection 7 moves to the left as viewed in FIG. 2 and extended when the connection 7 moves to the right as viewed in FIG. 2. The ratio of extension/retraction of the actuator 1 to movement of the output connection 7 may be adjusted during a design stage by varying the geometry of the parts. For example, the output connection 7 may be moved closer to the mounting 6 to reduce the movement of the output connection 7 or may be moved away from the mounting 6 to increase the movement of the output connection 7. For even greater movement, the output connection 7 may be provided on an extension of the output member that extends beyond the pivotal connection to the link 22 away from the mounting 6. During operation, the amount of extension/retraction of the actuator 1 may be varied to alter the movement of the output connection 7.

Generally, it will be desirable for the actuator 1 to complete one stroke (a stroke being a complete cycle of movement including both retraction and extension of the actuator) for each revolution of the rotor 102 and the rotor blade 103.

As will now be understood, the actuator 1 is extended and retracted by the electric motor assembly 30 drivingly rotating the drive shaft 31. According to the direction of rotation, that moves the nut 33 towards or away from the motor assembly 30, thereby extending or retracting the actuator 1. The amount of the movement of the actuator 1 is controlled by the position sensor system 45, 46 and 47. Typically the amount of movement is not very great; in one particular example of the invention the centre to centre spacing of the flanges 27 and 28 is a maximum of 62 mm when the actuator is fully extended and a minimum of 60 mm when the actuator is fully retracted. The small movement is, however, typically at a frequency matching the speed of rotation of the rotor and may therefore be as much as 40 Hz.

In operation, as the nut 33 reciprocates axially along the shaft 31, so the piston 25 reciprocates relative to the gland 36 in which it is received. This reciprocation together with the operation of the valve members 38 and 39 results in a pumping action as will now be described.

Referring first to FIG. 3 the actuator is shown at an almost fully extended position and at the commencement of retraction with the nut 33 therefore moving to the left as viewed in FIG. 3. In this condition the piston is being pressed further into the gland 36, pressurizing lubricant in the cylindrical chamber in the gland. The pressure in the chamber maintains the ball 38 pressed against the opening 40 into the sump 37, preventing lubricant in the cylindrical chamber entering the sump. The pressurised lubricant is therefore driven along the passageway 41 past the valve member 39 which is lifted off its seating 42, towards the motor assembly 30. It may be noted that the g force that is present in the usual case where the rotor is rotating opposes this movement of the lubricant but is unable to prevent it. The passageway 41 extends almost as far as the motor assembly 30 and then extends radially outwardly emerging from the shaft 31 between the main bearing 32 and the motor assembly 30. This flow of lubricant is marked in FIG. 3 by arrows. Lubricant is prevented from entering the region of the motor by a retainer 50 which provides a running seal with the end of the motor armature 35. The flow of lubricant continues until the actuator stops retracting.

Referring now to FIG. 4, the actuator is shown at an almost fully retracted position and at the commencement of extension with the nut 33 therefore moving to the right as viewed in FIG. 4. In this condition the piston is being withdrawn from the gland 36, resulting in a low pressure of lubricant in the cylindrical chamber in the gland. That allows the ball 38 to move away from the opening 40 into the sump, allowing lubricant in the sump 37 to flow into the cylindrical chamber in the gland 36. At the same time lubricant in the passageway 41 is prevented from returning to the cylindrical chamber in the gland 36 by the valve member 39 which is pressed against the valve seat 42. Lubricant is driven by the centripetal accelerations of the parts from the region of the main bearing 32 back to the sump 37 through a multiplicity of small passageways (not shown) in the nut 33, which may be described as porous and further small passageways in the gland 49. These flows of the lubricant are marked diagrammatically in FIG. 4 by arrows. Thus a complete cycle of pumping of lubricant occurs during each stroke of the actuator. Any swarf that may be generated during operation is carried by the lubricant into the sump where, as a result of the centripetal acceleration of the sump in operation, it tends to remain.

In the illustrated embodiment of the invention the various parts of the linkages pivot about vertical axes. Usually that will be the preferred orientation of the linkages, taking account of the cross-sectional shape of the rotor blade in the region of its trailing edge, but it is also possible for the linkages to be oriented at 90 degrees to the orientation shown, so that FIG. 2 becomes a side view rather than a plan view and the linkages pivot about horizontal axes.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A method of actuating an aerodynamic element on a rotor blade, the method comprising the following steps:

providing an actuator comprising an electric motor having a rotary drive shaft, a bearing for mounting the rotary drive shaft along an axis extending along a length of the rotor blade, and a lubrication system for lubricating the bearing, the lubrication system including a sump closer to a tip of the rotor blade than the bearing, and a pump for pumping lubricant from the sump to the bearing, wherein a portion of the rotary drive shaft is threaded and a correspondingly threaded output member is mounted non-rotatably on the rotary drive shaft, whereby rotation of the rotary drive shaft results in linear movement of the threaded output member, wherein the actuator includes a housing having a first part in which the electric motor is received and a second part fixed to the threaded output member, the first and second parts being mounted for sliding movement relative to one another in a direction parallel to an axis of the rotary drive shaft, wherein the pump includes a piston defined by an end of the rotary drive shaft, a cylinder formed by a first gland fixed to an end of the threaded output member, a first one-way valve disposed between the first gland and the sump, and a second one-way valve defined by a valve member disposed within the end of the rotary drive shaft, wherein the actuator further includes a sensor system for detecting a position of the threaded output member along the axis of the rotary drive shaft and wherein the sensor system is located between the first and second parts of the housing, with elements of the sensor system being outside of one of the first and second parts of the housing and inside of the other of the first and second parts of the housing; and operating the pump to pump lubricant from the sump to the bearing, wherein the valve member moves between an open position that facilitates the lubricant to pass through the piston towards the bearing during an entirety of a compression stroke of the piston and a closed position that prevents flow of lubricant from a passageway of the rotary drive shaft and into the cylinder in the first gland during an expansion stroke of the piston.

2. The method according to claim 1, in which the pump completes a pumping cycle each time the rotor blade completes a revolution.

3. A rotor blade including an actuator comprising:
an electric motor having a rotary drive shaft,
a bearing for mounting the rotary drive shaft along an axis extending along a length of the rotor blade, and
a lubrication system for lubricating the bearing, the lubrication system including:
a sump closer to a tip of the rotor blade than the bearing, and a pump for pumping lubricant from the sump to the bearing,
wherein a portion of the rotary drive shaft is threaded and a correspondingly threaded output member is mounted non-rotatably on the rotary drive shaft, whereby rotation of the rotary drive shaft results in linear movement of the threaded output member that drives the pump,
wherein the pump includes a piston defined by an end of the rotary drive shaft, a cylinder formed by a first gland fixed to an end of the threaded output member, a first one-way valve disposed between the first gland and the sump, and a second one-way valve defined by a valve member disposed within the end of the rotary drive shaft,
wherein the first one-way valve moves between an open position that facilitates the lubricant to pass through the piston toward the bearing during an entirety of a compression stroke of the piston and a closed position that prevents flow of lubricant from a passageway of the rotary drive shaft and into the cylinder in the first gland during an expansion stroke of the piston,
wherein the actuator includes a housing having a first part in which the electric motor is received and a second part fixed to the threaded output member, the first and second parts being mounted for sliding movement relative to one another in a direction parallel to an axis of the rotary drive shaft,
wherein the actuator further includes a sensor system for detecting a position of the threaded output member along the axis of the rotary drive shaft, and
wherein the sensor system is located between the first and second parts of the housing with components of the sensor system being outside of one of the parts of the housing and inside of the other of the parts of the housing.

4. The rotor blade according to claim 3, wherein the first one-way valve includes a ball and a valve seat formed by a second gland that is disposed between the first gland and the sump.

5. The rotor blade according to claim 4, wherein the ball moves between a closed position in which it is seated in an outlet opening of the second gland to prevent flow of lubricant through the opening into the sump during a compression stroke of the piston and an open position in which the ball is clear of the opening and lubricant flows out of the sump and into the cylinder in the first gland during an expansion stroke of the piston.

6. A rotor blade including an actuator comprising:
an electric motor having a rotary drive shaft,
a bearing for mounting the rotary drive shaft along an axis extending along a length of the rotor blade, and
a lubrication system for lubricating the bearing, the lubrication system including
a sump closer to a tip of the rotor blade than the bearing, and a pump for pumping lubricant from the sump to the bearing,
wherein a portion of the rotary drive shaft is threaded and a correspondingly threaded output member is mounted non-rotatably on the rotary drive shaft, whereby rotation of the rotary drive shaft results in linear movement of the threaded output member that drives the pump,
wherein the pump includes a piston defined by an end of the rotary drive shaft, a cylinder formed by a first gland fixed to an end of the threaded output member, a first one-way valve disposed between the first gland and the sump, and a second one-way valve defined by a valve member disposed within the end of the rotary drive shaft,
wherein the actuator includes a housing having a first part in which the electric motor is received and a second part fixed to the threaded output member, the first and second parts being mounted for sliding movement relative to one another in a direction parallel to an axis of the rotary drive shaft,
wherein the actuator further includes a sensor system for detecting a position of the threaded output member along an axis of the rotary drive shaft, and
wherein the sensor system is located between the first and second parts of the housing with elements of the sensor system being outside of one of the first and second parts of the housing and inside of the other of the first and second parts of the housing
wherein the first one-way valve includes a ball and a valve seat formed by a second gland that is disposed between the first gland and the sump
wherein the ball moves between a closed position in which it is seated in an outlet opening of the second gland to prevent flow of lubricant through the opening into the sump during a compression stroke of the piston and an open position in which the ball is clear of the opening and lubricant flows out of the sump and into the cylinder in the first gland during an expansion stroke of the piston,
wherein the valve member moves between an open position that facilitates the lubricant to pass through the piston towards the bearing during an entirety of the compression stroke of the piston and a closed position that prevents flow of lubricant from a passageway of the rotary drive shaft and into the cylinder in the first gland during the expansion stroke of the piston.

7. The rotor blade according to claim 6, in which the threaded output member is arranged to drive the pump.

8. The rotor blade according to claim 7, in which the threaded output member is in a fixed axial relationship with the pump and the rotary drive shaft is in a fixed axial relationship with the piston and the cylinder.

9. The rotor blade according to claim 6, in which the bearing is positioned between the electric motor and the threaded output member.

10. The rotor blade according to claim 6, in which a travel of lubricant in the lubrication system from the sump away from the tip of the rotor blade does not reach the electric motor.

* * * * *